May 27, 1952  H. WEEKES  2,598,325
MEANS FOR SUPPLYING RUBBER RINGS TO TOOLS
Filed Oct. 24, 1949  2 SHEETS—SHEET 1
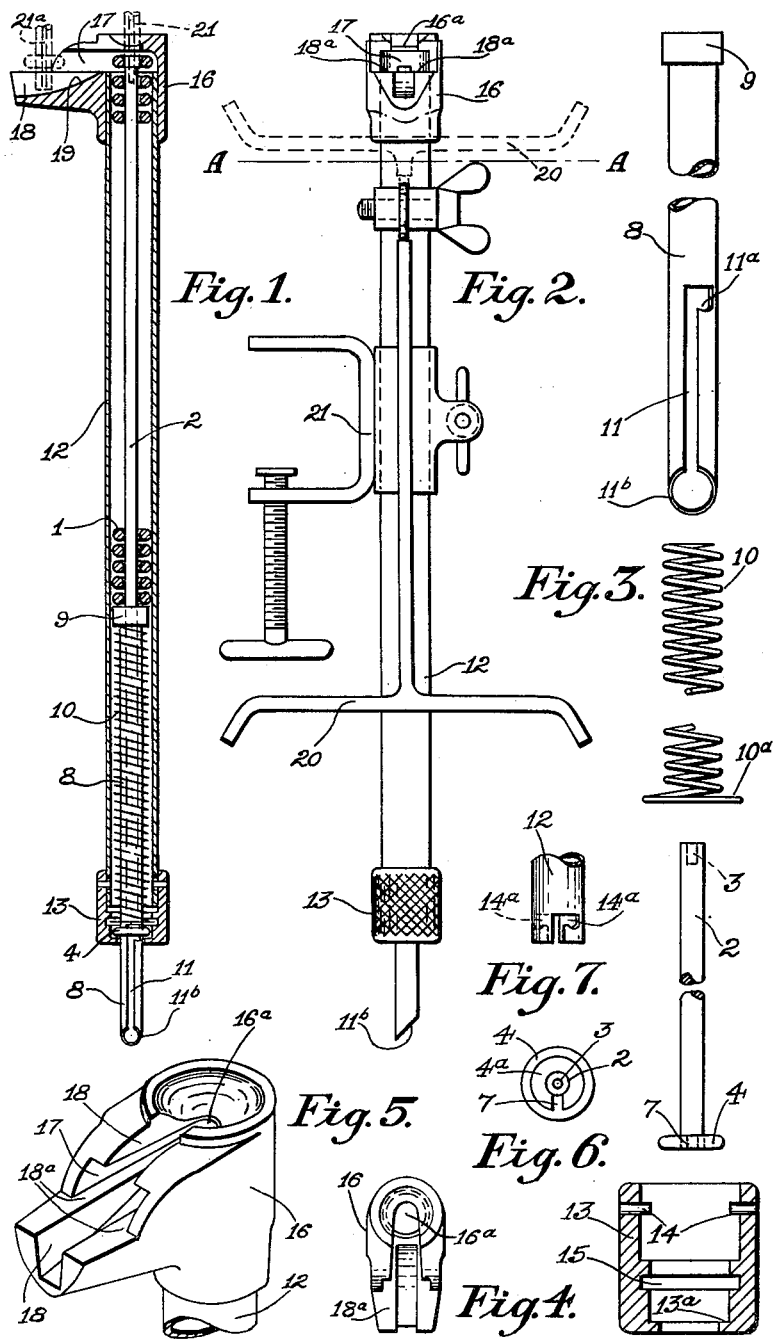

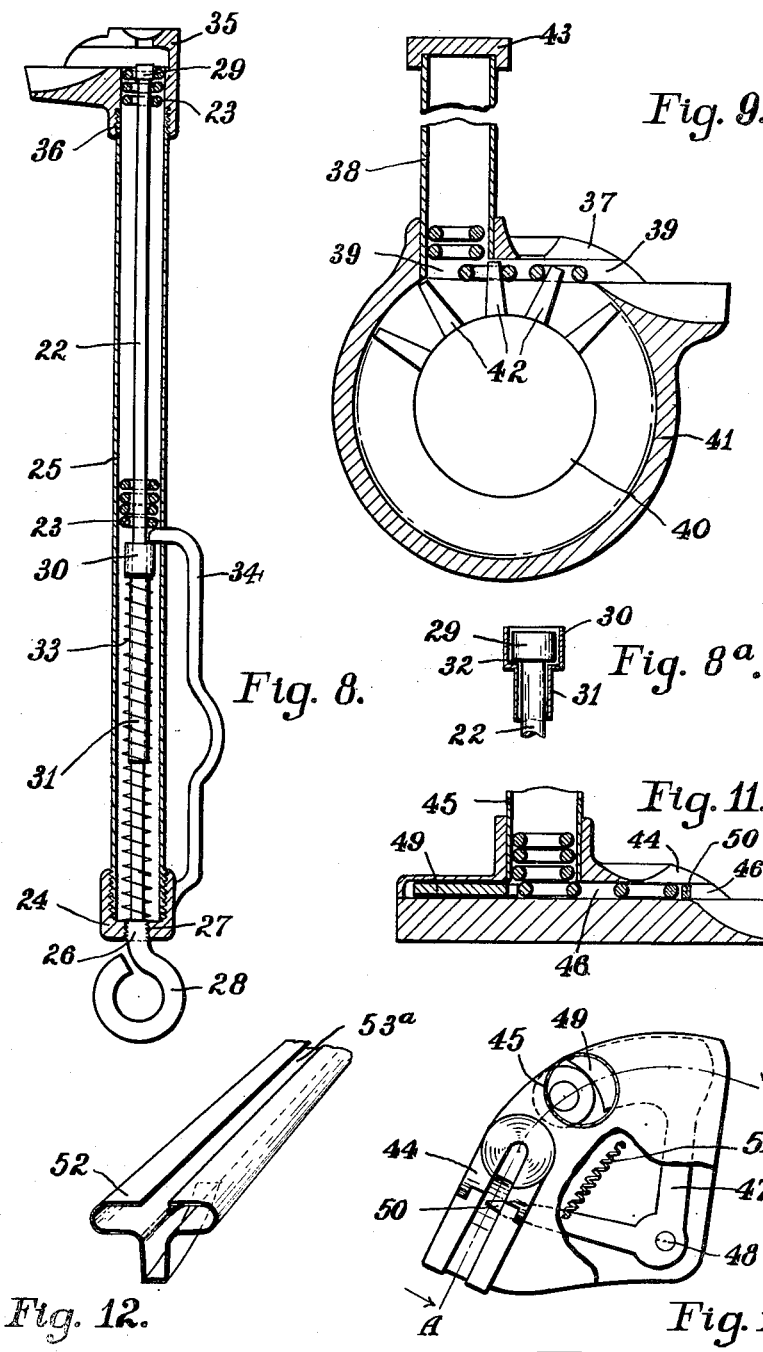

Patented May 27, 1952

2,598,325

UNITED STATES PATENT OFFICE 2,598,325

MEANS FOR SUPPLYING RUBBER RINGS TO TOOLS

Harold Weekes, Mataroa, Taihape, New Zealand

Application October 24, 1949, Serial No. 123,207
In New Zealand October 28, 1948

12 Claims. (Cl. 312—46)

This invention provides means for delivering flexible rings of rubber or the like material from a source of supply to a position at which they can be engaged by an expanding tool and extracted thereby and placed upon other objects.

The object of the present invention is to facilitate the operation of placing rubber or the like flexible rings upon a tool for expanding them for any purpose and thus obviate the tardy and often troublesome operation of placing them on the tool by hand. A particular use for such a device is that for placing the rubber rings upon the expanding jaws of an instrument for passing the rubber band around the scrotums of lambs in order to render the latter sterile.

According to this invention the means for delivering the flexible rings of rubber or the like material comprises a magazine to receive a supply of the rings and to permit them to move in succession therefrom and of a delivery head connected to and open to said magazine to receive each successive ring therefrom and formed to enable successive rings entering said head to be removed therefrom by the extracting tool.

The delivery head of the device so provided is formed with a delivery slot for the rings and also with an extracting slot traversing the delivery slot for the passage of the extracting tool into the ring as the latter enters the delivery slot means being provided for projecting the rings from the magazine into such delivery slot.

This extracting slot is preferably made deeper towards its outlet from the head so that as the extracting tool is moved outwardly the ring will be moved further on to the tool.

In one form of the invention the magazine is in the form of a tubular member within which a rod on which a supply of rings is to be threaded while spring loaded means within the member normally project the rings along the rod and to project the outermost ring into the delivery means clear of the rod.

A sliding sleeve telescoping over the rod is formed with a head against which the rings are supported and is under the tension of a spring so that it will normally project the sleeve along the rod and thereby project the rings to the delivery slot in the head, means being provided between the rod and the sleeve to lock the one to the other during the loading of the rings on to the rod and to release these two parts and to disengage the parts in order to permit the sleeve to slide on the rod under the spring tension and thereby to force the rings successively into the delivery slot.

In an alternative form of the device a wheel casing is associated with the delivery head and forms a housing for a delivery wheel having radial arms or spokes each of which are adapted as the wheel is rotated by the action of a ring being withdrawn by the extracting tool to engage the rings in succession and convey them from the magazine along the delivery slot to the position where each ring so conveyed can be engaged by the extracting tool. In this case the magazine preferably consists of a tube mounted in the head and open to the delivery slot opposite the path of the arms.

In another form of the device the delivery means consists of a spring operated bell crank lever pivoted within a housing forming part of the head and adapted to rock in the same plane as the movement of the rings towards the delivery slot. One arm of this lever is adapted to push a ring lying within the delivery slot along such slot to the tool engaging position when the other arm of the lever is moved by a ring being extracted from the slot.

In a simple form of the device the magazine is formed by an extension of the delivery head and delivery slot such extension being of a length to receive a supply of the rings. The extractor slot also extends along the magazine portion to enable the rings to be towards the delivery end of the head.

The invention will now be particularly described with reference to the accompanying drawings, in which:

Figure 1 is a sectional side elevation of the device in an operative position.

Figure 2 is a front elevation of the device.

Figure 3 is a fragmentary and exploded view of portions of the device, but drawn to a larger scale than the preceding views.

Figure 4 is a plan view of the portion of the device above the line A—A in Figure 2.

Figure 5 is an isometric view, but drawn to a larger scale, of the portion of the device above the line A—A in Figure 2.

Figure 6 is a plan of the rod referenced 2 in Figures 1 and 3.

Figure 7 is a view of a detail.

Figure 8 is a sectional side elevation of a modified form of the device in a semi-operative position.

Figure 8A is a sectional elevation of a detail of the device illustrated in Figure 8.

Figure 9 is a sectional side elevation of a further modification of the device in an operative position.

Figure 10 is a plan of a further modification of the device.

Figure 11 is a sectional elevation taken on the line A—A of Figure 10 looking in the direction of the arrows.

Figure 12 is an oblique projection of portion of a further modification of the device.

Referring now to the form of the device illustrated in Figures 1 to 7 of the drawings, it will be seen that the rubber rings 1 to be supplied to the hand tool are threaded over and held on a rod 2, one end of which has a small hole or recess 3 adapted to receive the end of a wire (not shown) upon which the rings may be collected before being fed on to the rod. The other end of the rod 2 is provided with a stop which may conveniently be in the form of a ring 4 as shown in Figures 3 and 6 and which is connected with the rod 2 by a short radial piece or spoke 7. From Figure 6 it will be seen that the rod is disposed centrally within the ring so as to leave an annular space 4a except for the spoke 7, between the inner periphery of the ring and the rod. On the rod 2 there is telescopically mounted a sleeve 8 which has a headed portion 9 and which tends to move upwardly under the influence of a coil spring 10 compressible between said headed portion 9 and a base cap 13. The sleeve passes through the ring 4 which will be supported upon a shoulder 13a within the cap 13, while the bottom end of the spring 10 is held within a groove 15 within the cap. To enable the sliding sleeve 8 to pass through the ring 4 it is formed with a slot 11 extending from its lower end and having a notch 11a therefrom for locking the sleeve at a position shown in Figure 1. Locking of the sleeve is conveniently carried out by rotating it until the radial piece 7 at the end of the rod 2 will enter slot 11 thereby locking the two parts together. To facilitate this operation the lower end of the sleeve may be cut away at an angle towards the base of the slot 11 as shown in Figure 2 at 11b. A tube 12 in which the sleeve 8 and its rod 2 are inserted is secured at its lower end in the cap 13 which is provided with projections 14 over which slots 14a of a bayonet joint (see Figure 7) will pass and thereby lock the tube to the cap.

The upper end of the tube will form the magazine in which are contained the rings 1 threaded over the rod 2.

Fitted to the upper end of the tube 12 there is a delivery head 16 against which the uppermost rubber ring is held in position clear of the upper end of the rod 2 under pressure of the head 9 against the rings below. This delivery device contains an opening 16a at its upper end for the insertion of closed tines of an expanding tool into the ring as will be hereinafter described. A delivery slot 17 extends outwardly from the space occupied by the topmost ring beneath the opening 16a while an extracting slot 18 traversing the slot 17 at right angles thereto extends outwardly from the delivery head as shown in Figures 1 and 5 for the passage of the closed tines to enable the ring to be extracted. The slot 17 being wider than the extracting slot 18 will thus provide shoulders 18a on each side of the slot 18. To facilitate the delivery the bottom of the slot 18 may be curved downwardly as at 19 (Figure 1).

Upon the tube 12 and near the delivery head a supporting device 20 such as a T-shaped piece may be provided for the hand tool, such piece being pivoted in an adjustable collar 21 so that it can be swung upwardly to a position upon the tube, as indicated by dotted lines in Figure 2 and thus provide a convenient resting place for the hand tool.

A clamp 21 similarly mounted on the tube 12 may be provided by which the device is affixed to a working board or bench.

The device is assembled by passing the rod 2 through the spring 10 and then positioning the ring 4 against the shoulder 13a of the cap 13 and then inserting the lower coil 10a of the spring, which coil is of a larger diameter than the remaining coils, into the recess 15 of the cap. The sleeve 8 is then passed downwardly from the upper end of the rod through the spring 10 and through the ring 4, the spoke 7 passing along the slot 11. The head 9 will thereby compress the spring until the spoke 7 reaches the notch 11a whereupon by turning the sleeve to cause the spoke to enter the notch the two parts are locked together and the position so far as the above parts are concerned will be that shown in Figure 1.

To load the device the rings are threaded over the upper end of the rod and will be supported against the head 9. To facilitate this they may be first placed on a wire (not shown) the end of which is inserted in the hole 3 at the top of the rod and then slid on to the rod. When sufficient rings have been so placed on the rod the tube 12 having the delivery head at its upper end is passed over the rings and over the sleeve and its bottom end is inserted into the cap 13 with the slots 14a registering with the projections 14 and then being locked into the projections by a turning movement.

Upon the release of the spoke 7 of the ring 4 from the notch 11a the spring 10 will project the sleeve 8 upwards and thereby cause the head 9 to compress the rings 4 upwardly in order to bring the uppermost ring clear of the upper end of the rod and into the slot 17 and against the wall around the opening 16a.

To remove the upper ring and at the same time carry it on to the expanding tool from which it is to be used, the closed tines of such expanding tool, indicated by the dotted lines 21 in Figure 1, are inserted into the ring through the opening 16a in the head. By now moving the tines along the delivery slot 17 the ring is carried outwardly along such slot and by a pressure downwardly the ends of the tines move along the descending part of the slot 18 thereby forcing the ring, which is supported on the shoulder 18a on each side of the slot 18 further on to the tines, as indicated by the dotted lines at 21a in Figure 1.

As the uppermost ring is removed, the ring immediately below it will, under pressure of the spring move into the head clear of the end of the rod and ready to be removed by the tines.

To reload the device the tube 12 is disconnected from the cap 13 by unlocking the bayonet joint and the sleeve 8 is pushed down against the pressure of the spring until the slot 11 can pass the spoke 7 and enter the notch 11a and be locked in position. The fresh rings are then loaded on the rod as above described, the tube with its delivery head is replaced, and the spoke 7 is disengaged from the notch 11a to permit the rings to be forced along the rod.

In the modified form of the device as illustrated in Figure 8, the rod 22 on which the rings 23 are mounted passes right through the removable cap 24 at the base of the tube 25 and is securable therein by means of a screw thread formed on a thickened portion 26 of the rod 22 and adapted to be screwed into a corresponding threaded portion 27 of the base cap 24 through which the rod passes.

The lower end of the rod 22 below the thickened threaded portion 26 is formed as a ring 28 so as to constitute a suitable gripping means whereby the rod may be unscrewed from the base cap 24 or moved up or down. The upper end of the rod 22 is formed or provided with a shoulder 29 adapted to pass within the splayed end 30 of the sliding sleeve 31 and to bear against a corresponding shoulder 32 formed within the splayed end 30 of the sleeve (see Figure 8A). When the rod 22 is unscrewed from the base cap and drawn downwards, the shoulder 29 on the end of the rod bears against the shoulder 32 within the sleeve 31, and the sleeve may thereby be drawn downwards with the rod against the pressure of the coil spring 33 to a point where the end of the sleeve engages with and is retained in position by an end of the spring arm 34 projecting through a hole in the tube 25, the spring arm 34 being secured at its other end to the base cap 24. The delivery head 35 is provided with a screw thread 36 whereby it may be removably secured to the upper end of the tube 25, and when the sleeve 31 has been drawn down as above described to engage with the end of the spring arm 34, the delivery head is unscrewed from the tube 25 in order that a supply of rubber rings may be fed onto the rod 22 in any convenient way. The delivery head is then replaced on the tube 25, and the spring arm 34 is drawn outwards to release the sleeve 31, which under the action of the spring 33 moves upwards and compresses the rings 23, thereby maintaining a constant supply of rings to the delivery head 35. The operation of the device then proceeds as before.

In another form of the device as illustrated in Figure 9, the delivery head 37 has a magazine tube 38 mounted upon it and open to the delivery slot 39 which is the same as the slot 17 in Figure 5. A casing 41 integral with the head forms a housing for a wheel 40 rotatable therein. This wheel 40 is formed with a number of suitably spaced radial arms 42 adapted to convey the rings one at a time from the magazine along the delivery slot 39 as the wheel is rotated. The magazine tube 38 is mounted in the same vertical plane as the delivery slot and the rings within the tube 38 are fed downwards by gravity as the bottom ring is drawn away by an arm 42. The wheel is adapted to be revolved through the required distance by the action of withdrawing each ring from the delivery slots of the device, the arms 42 being of such a length that they are not free of each ring until the latter has been drawn a part of the way along the slide provided in the delivery portion. The magazine tube 38 may be provided with a cap 43.

In a still further form of the device, as illustrated in Figures 10 and 11 of the accompanying drawings, the delivery portion 44 is associated with means for feeding a supply of rings thereto consisting of a magazine tube 45 mounted adjacent to the delivery portion 44 and whence the rings may be conveyed one at a time along a delivery slot 46 to a position within the delivery portion by means of an arm 47 in the form of a bell crank pivotable horizontally on a pin 48 in the same plane as the slide 46. One end 49 of the arm 47 is adapted to move the lowermost ring of those contained in the tube 45 along the slide 46 to the delivery portion 44, by means of the movement of the other end 50 of the arm, which end 50 is adapted to be engaged through a certain distance by each ring as the latter is withdrawn from the delivery portion 44 of the device. A spring 51 is provided to return the arm 47 to its original position as it becomes disengaged from each ring after the latter has been drawn to a certain distance along the slide formed in the delivery portion. To enable the end 50 of the arm 47 to project into the delivery portion 44 and to be engaged by the rings as they are withdrawn, one side of the delivery portion is cut away sufficiently to allow for the movement of the arm 47 therethrough.

In a simple form of the device, as illustrated in Figure 12 of the accompanying drawings, the rings may be fed into the delivery portion 52 along a rearward extension 53a being of sufficient length to enable a supply of rings to be contained therein.

In all the above described forms of the invention, the construction of the delivery portions remains substantially the same, and consists in all cases of a partially open delivery slot along which the rubber rings may be drawn by the tines of a hand tool, together with an extracting slot formed in the delivery portion at right angles to the slide, the said slot being open at its portion above the slide to enable the tines of the tool to be drawn through the slot, and being provided with a descending deeper portion below and towards the extremity of the slide against which the ends of the tines may be made to bear and whereby the rings are forced further onto the tines. In all cases the delivery portion is associated with means whereby a supply of rings may be fed to the delivery portion as needed while the device is in operation.

What I claim is:

1. In an apparatus for supplying flexible rings to a tool for expanding the rings, the combination of a body constituting a delivery head, and having a longitudinal passage formed therein, to constitute a delivery slot for said rings and having inlet and outlet ports at its ends, respectively, to permit travel of the rings, successively, through said passage, said body also having a second longitudinal passage formed therein, to constitute a guideway for said expanding tool, the longitudinal axes of said passages lying in a common vertical plane, said guideway extending below and above said slot and opening through the top of said body; and a magazine for the rings, attached to said body and having a discharge port communicating with said inlet port of said slot.

2. A device claimed in claim 1 wherein spring operated means are associated with the magazine to project the rings therefrom into the delivery slot of the delivery head.

3. A device as claimed in claim 1, wherein said magazine has a tubular member attached to the said delivery head, a rod within the tube on which a supply of rings can be threaded and wherein there are spring loaded means within the tube normally to project the said rings along said rod and the outermost ring thereon into the delivery slot clear of the rod.

4. A device as claimed in claim 1, wherein said magazine has a tube attached to the said delivery head, a rod within the said tube, on which rod a supply of rings can be threaded, a cap on the lower end of said tube, to support the said rod, and spring loaded member located around the rod.

5. A device as claimed in claim 1, wherein said magazine has a tube attached to the said delivery head, a rod within the said tube on which a supply of rings can be threaded, a cap on the lower end of said tube to support the rod, a sleeve telescoping over the rod and having a head for supporting the rings and of a coil spring surrounding the sleeve and in compression between the cap and the head of the sleeve.

6. A device as claimed in claim 1, wherein said magazine has a tube attached to the said delivery head, a rod within the said tube on which a supply of rings can be threaded, a cap on the lower end of said tube to support the rod, a sleeve telescoping over the rod and having a head for supporting the rings and of a coil spring surrounding the sleeve and in compression between the cap and the head of the sleeve, and wherein locking means between the said sleeve and the rod enable the sleeve to be held against the tension of the coil spring when the apparatus is to be loaded with rings.

7. A device as claimed in claim 1, wherein said magazine has a tube attached to the said delivery head, a rod within the said tube on which a supply of rings can be threaded, a cap on the lower end of said tube to support the rod, a sleeve telescoping over the rod and having a head for supporting the rings and of a coil spring surrounding the sleeve and in compression between the cap and the head of the sleeve, and wherein locking means between the said sleeve and the rod enable the sleeve to be held against the tension of the coil spring when the apparatus is to be loaded with rings, and wherein the anchored end of the rod has a ring axially attached to it by a spoke which will enter a slot in the telescoping sleeve sliding within the ring.

8. A device as claimed in claim 1, wherein said magazine has a tube attached to the said delivery head, a rod within the said tube on which a supply of rings can be threaded, a cap on the lower end of said tube to support the rod, a sleeve telescoping over the rod and having a head for supporting the rings and of a coil spring surrounding the sleeve and in compression between the cap and the head of the sleeve, and a removable member extending from said cap on the exterior of the said tube and entering the said tube above the head on the sleeve to form a stop to permit the rings to be threaded on the rod.

9. A device as claimed in claim 1, wherein a casing is formed below the said delivery head, a wheel rotatable therein and means on said wheel to engage a ring from the exit of the magazine and convey it along the delivery slot, and means to enable the wheel to be rotated through the necessary distance by the action of the withdrawal of successive rings from the delivery portion of the extracting and expanding tool.

10. A device as claimed in claim 1, wherein a casing is formed below the said delivery head, a wheel rotatable therein and means on said wheel to engage a ring from the exit of the magazine and convey it along the delivery slot, and means to enable the wheel to be rotated through the necessary distance by the action of the withdrawal of successive rings from the delivery portion by the extracting and expanding tool, wherein said wheel is formed with a number of radial spokes successively to engage a ring.

11. A device as claimed in claim 1 wherein a casing is combined with the said delivery head, a bell crank under spring tension pivoted in said casing and having one arm adapted to engage and move successively a ring into the delivery slot, said arm formed and arranged to move through the necessary distance as each ring is withdrawn.

12. A device as claimed in claim 1 wherein said magazine consists of an extending portion from the delivery head in the same direction as the delivery slot which is extended along said magazine portion, and wherein the extracting slot also extends along said magazine portion to enable the rings to be moved along it.

H. WEEKES.

REFERENCES CITED

The following references are of record in the file of this patent:

UNITED STATES PATENTS

| Number | Name | Date |
| --- | --- | --- |
| 1,250,038 | Shirley | Dec. 11, 1917 |
| 1,284,597 | Clinchy | Nov. 12, 1918 |
| 2,274,238 | Henderson et al. | Feb. 24, 1942 |

FOREIGN PATENTS

| Number | Country | Date |
| --- | --- | --- |
| 40,180 | Germany | Aug. 2, 1887 |
| 179,348 | Great Britain | May 11, 1922 |